United States Patent Office 2,710,797
Patented June 14, 1955

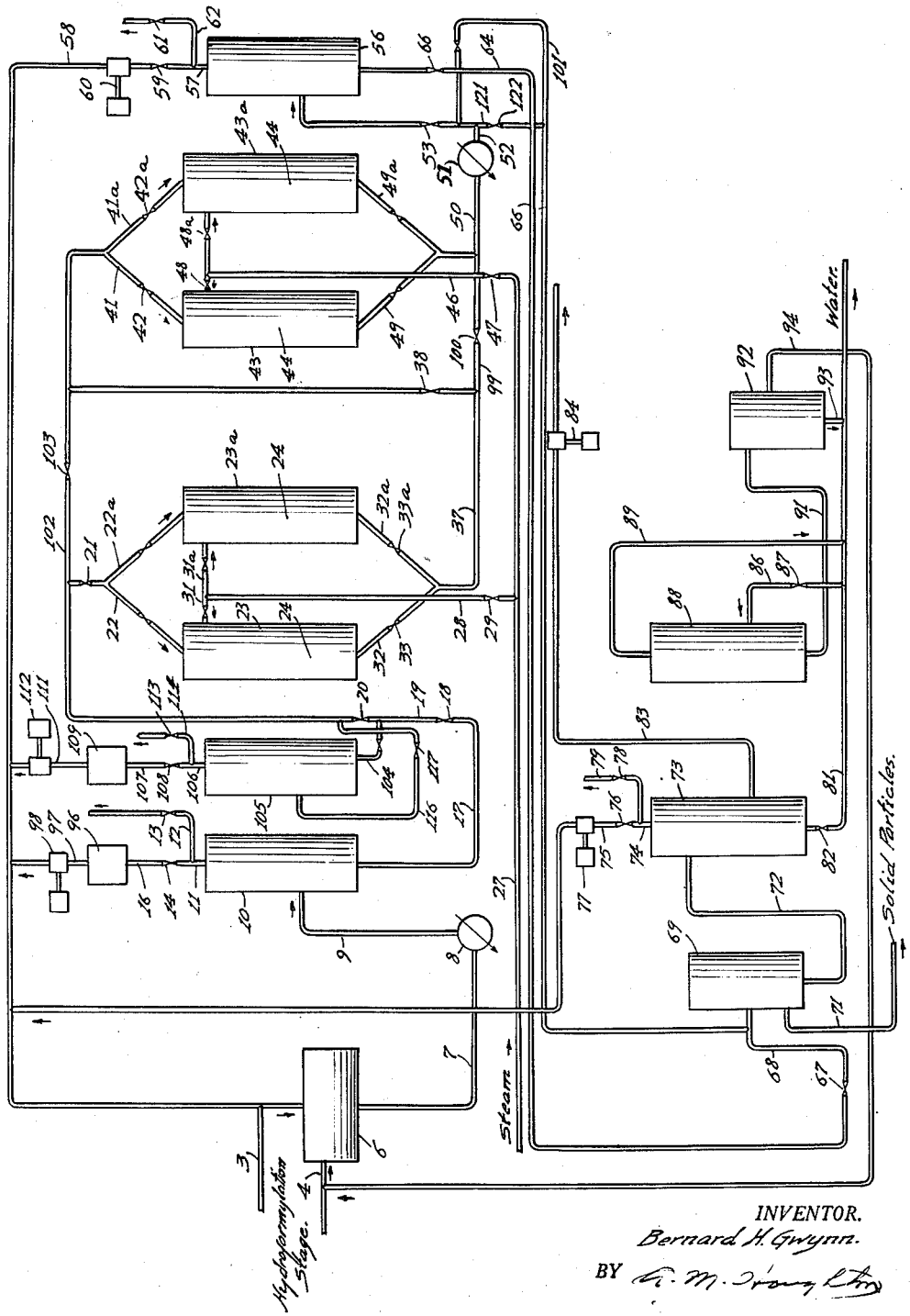

2,710,797

PROCESS FOR REMOVING METALS FROM HYDROFORMYLATION PRODUCTS

Bernard H. Gwynn, Fawn Township, Allegheny County, Pa., assignor to Gulf Research & Development Company, Pittsburgh, Pa., a corporation of Delaware Application December 30, 1950, Serial No. 203,590

3 Claims. (Cl. 75—28)

This invention relates to a process for removing metals from a stream containing the metals as carbonyls. More particularly, this invention relates to a process for removing catalytic metals and metals employed for making steel alloys from a stream containing catalytic and alloying metals as carbonyls.

During the hydroformylation of olefins, which is also known as the carbonylation or oxonation of olefins, a product stream is produced which contains a mixture of hydroformylation reaction products and unreacted olefins, carbon monoxide, and hydrogen. The hydroformylation reaction products usually contain a large proportion of aldehydes and smaller proportions of alcohols, acetals, and other organic compounds. The product stream discharged from the hydroformylation stage is at a hydroformylation pressure which is usually in the range of about 1,500 to about 4,500 pounds per square inch, and a hydroformylation temperature in the range of about 100° to about 600° F.

The hydroformylation product stream also contains dissolved in the mixture of reaction products and unreacted olefins a catalytic metal carbonyl. The catalytic metal is originally introduced into the hydroformylation reaction stage as the carbonyl or is converted to the carbonyl in the reaction zone. Cobalt or iron is usually employed as the catalytic metal.

The hydroformylation reaction zone and the transfer lines used in the hydroformylation stage are usually made of iron or iron alloys. The reactants in the hydroformylation stage slowly dissolve the walls of the reactor and the transfer lines. In this way iron carbonyl is produced when the walls of the reactor and the transfer lines are constructed of iron, and carbonyls of alloying metals are also produced when the walls are constructed of iron alloys. The alloying metal carbonyls in addition to iron carbonyls usually comprise those of nickel, chromium, and molybdenum. The hydroformylation reaction products, the unreacted olefins, carbon monoxide, and hydrogen and the dissolved carbonyls together comprise the hydroformylation stage products or the total reaction products from the hydroformylation stage.

It is desirable to remove the metal carbonyls from the reaction products as the first step in recovering aldehydes and other hydroformylation reaction products from these products because the metal carbonyls catalyze condensation reactions of the aldehydes at the temperatures usually employed for separating the aldehydes. In addition when the hydroformylation stage products are sent directly to a hydrogenation stage in an Oxo process formed of these two stages, it is also necessary to remove the metal carbonyls. Under the usual conditions of hydrogenation, carbonyls present in a charge material are decomposed and the metals are deposited upon the hydrogenation catalyst. When an appreciable amount of a catalytic metal such as iron or cobalt is deposited upon a hydrogenation catalyst, the efficiency of the hydrogenation catalyst is appreciably reduced because the surface of the catalyst is covered with the catalytic metal. In addition iron and alloying metals act as a poison for a number of hydrogenation catalysts and when even a small amount of any of these metals is deposited upon such a hydrogenation catalyst, a substantial reduction in yield in the hydrogenation stage results.

When cobalt is employed as the catalytic metal, it is also desirable to separately recover the cobalt in order that it can be reprocessed and recycled.

I have found that catalytic metal and other metal carbonyls can be removed from hydroformylation stage products by introducing steam into the products in an amount sufficient to heat the products to the decomposition temperature of the carbonyl with the highest decomposition temperature. I have further found that when cobalt is employed as the catalytic metal, cobalt can be separately recovered from hydroformylation stage products containing cobalt carbonyl and other metal carbonyls by introducing steam in an amount sufficient to heat the hydroformylation stage products to the decomposition temperature of cobalt carbonyl and below the decomposition temperatures of the other metal carbonyls, and then recovering the cobalt. The other metal carbonyls can then be removed from the substantially cobalt-free hydroformylation stage products by introducing steam in an amount sufficient to heat the resulting mixture to the decomposition temperature of the remaining metal carbonyls with the highest decomposition temperature.

The process of the invention has the advantage that the mixture is rapidly and uniformly heated to the desired decomposition temperature while at the same time deposition of metals on the walls of the apparatus employed is avoided. The use of steam in accordance with the process of my invention is advantageous because steam can be employed at a pressure and temperature such that it condenses at temperatures above the decomposition temperature of the metal carbonyl or carbonyls which are being removed. In this way, the high heat of vaporization of the steam can be utilized. In addition, the steam can be readily separated from the hydroformylation stage products after the metal or metals have been removed. Steam also has the advantage that it prevents the reaction of the various hydroformylation stage products and the consequent formation of undesirable heavier organic compounds. In using steam, the steam can be wet or dry and it can be superheated.

The temperature which is employed in removing the metal carbonyls depends upon the metal carbonyls which are present. In general, I have found that cobalt carbonyl is efficiently removed when the temperature is in the range of 165° to 212° F. A temperature of from about 340° to 420° F. gives preferred results for the removal of iron, nickel, chromium, and molybdenum carbonyls. In addition this temperature range is sufficiently low so that any adverse effect upon the reaction products is avoided.

The process of my invention can be operated to remove a catalytic metal and other metal carbonyls from the hydroformylation stage products which contain synthesis gas consisting of carbon monoxide and hydrogen or which are substantially free of such synthesis gas.

An embodiment will now be described in which cobalt and a mixture of iron and other alloying elements are separately removed in accordance with the process of my invention from a mixed phase mixture of liquid reaction products and gaseous synthesis gas, the mixed phase being formed by reducing the pressure on a liquid phase containing the components at a higher pressure. The embodiment will be described in conjunction with the single figure of the drawing. This figure is a simplified flow sheet of apparatus suitable for use in carrying out my invention.

Referring to the drawing, a mixture of carbon monoxide and hydrogen is introduced by line 3 and a mixture of cobalt 2-ethylhexanoate and olefins is introduced by means of line 4 to hydroformylation stage 6 which is maintained at a pressure of about 3,500 pounds per square inch and a temperature of about 360° F. In the hydroformylation stage, the olefins react with the carbon monoxide and hydrogen to form hydroformylation reaction products which are chiefly aldehydes but which also include smaller amounts of alcohols, acetals, and other organic compounds. The hydroformylation stage products also contain unreacted olefins, carbon monoxide, and hydrogen and are removed from the hydroformylation stage by means of line 7. Cobalt carbonyl and alloying metal carbonyls such as iron, nickel, chromium, and molybdenum are also contained in the reaction products.

The reaction products at the hydroformylation temperature and pressure are passed by line 7 to cooler 8 and are cooled therein to a temperature below 100° F. The cooled hydroformylation products are passed by line 9 to high-pressure separator 10. In high-pressure separator 10 a gas phase containing carbon monoxide and hydrogen and a smaller amount of carbonyls and organic compounds dissolved therein is separated from a liquid phase comprising the remainder of the reaction products. The vapor phase is removed by line 11 and is vented from the system by means of line 12 and pressure regulating vent valve 13, valve 14 in line 16 which is also connected to outlet line 11 being closed.

The liquid hydroformylation stage products at a pressure of about 3,500 pounds per square inch and a temperature of about 100° F. are then passed by line 17 through pressure regulating valve 18 and are reduced therein to a pressure of about 450 pounds per square inch. The hydroformylation stage products at the reduced pressure form a mixed phase in which gaseous synthesis gas is mixed with hydroformylation products which are liquid at 450 pounds per square inch and 100° F. The mixed phase materials are passed by means of line 19 containing valve 20 which is open, valved line 21, and valved line 22 or 22a to the decobalting tower 23 or 23a. The decobalting towers contain a packing material such as pumice 24. Saturated steam at a pressure of about 450 pounds per square inch and a temperature of about 460° F. is introduced by means of manifold 27, line 28 containing valve 29, and valved line 31 or 31a to decobalting tower 23 or 23a. The mixed phase reaction products are heated by the steam to a temperature of about 212° F., the mixture of reaction products and steam discharged from the decobalting towers having a partial pressure of steam of about 1 atmosphere. Cobalt carbonyl is decomposed in the decobalting towers and deposits on the pumice. The cobalt can be removed from the tower by dissolving it in weak acids or by treating it with carbon monoxide at an elevated temperature.

The substantially cobalt-free mixed phase hydroformylation stage products at a pressure of about 440 pounds per square inch and a temperature of about 212° F. are removed from the decobalting towers by lines 32 and 32a which contain valves 33 and 33a. The mixture of reaction products and steam is passed by line 37 which contains valve 38 and by lines 41 and 41a containing valves 42 and 42a to the demetalling towers 43 and 43a. The demetalling towers also contain a packing material such as pumice 44. Saturated steam at a pressure of about 440 pounds per square inch is admitted from manifold 27 by line 46 containing valve 47 and lines 48 and 48a to the demetalling towers 43 and 43a. The mixture of reaction products and water is heated in the demetalling towers to a temperature of about 380° F., the mixture discharged from the demetalling towers at a pressure of about 430 pounds per square inch having a partial pressure of steam of about 180 pounds per square inch. Iron carbonyl and other alloying metal carbonyls are decomposed in the demetalling towers and part of the metals is deposited on the packing material. The remaining portion of the metal carbonyls is converted to soluble compounds which are subsequently removed from the reaction products in the manner described below.

The hydroformylation stage products from which the catalytic metal and alloying metal carbonyls have been removed are then passed by means of valved lines 49 and 49a and line 50 to the cooler 51. In cooler 51 the mixed phase hydroformylation stage products are cooled to a temperature of about 110° F. The cooled mixture of reaction products at the intermediate pressure of about 430 pounds per square inch is then passed by line 52 containing valve 53 to the intermediate pressure separation tower 56. In this tower the liquid and vapor phases are separated, the vapor phase which consists chiefly of synthesis gas being removed overhead by means of line 57. The synthesis gas which is free of catalytic and alloying metal carbonyls is recycled to the hydroformylation stage by means of gas recycle line 58 which contains valve 59 and compressor 60, pressure controller vent valve 61 in vent line 62 which also discharges from line 57 being closed.

The liquid phase hydroformylation stage products at a temperature of about 110° F. and an intermediate pressure of about 430 pounds per square inch are removed by means of line 64 containing valve 66 and are passed through pressure reducing valve 67 where the pressure is reduced to about 5 pounds per square inch. The products at substantially atmospheric pressure and a temperature of about 110° F. are passed by line 68 to filter 69. In filter 69 pulverized and finely divided pumice and other solid particles are removed and discarded by means of line 71. This filter also breaks the emulsion formed by the aqueous and organic materials in the hydroformylation stage products. The mixture of reaction products is passed by line 72 to low-pressure separator or low-pressure trap 73. In the low-pressure trap synthesis gas is recycled by means of line 75 which contains valve 76 and compressor 77 and then by means of synthesis gas recycle line 58 to the hydroformylation stage. The recycled synthesis gas is free of catalytic metal and alloying metal carbonyls. When synthesis gas is being recycled, pressure regulating vent valve 78 in vent line 79 is closed.

A water layer containing dissolved iron and alloying metal compounds is removed by means of line 81 and is discharged from the system. Hydroformylation products which are free of carbon monoxide, hydrogen, catalytic metal, and alloying metal carbonyls and which are at substantially atmospheric pressure and a temperature of 110° F. are passed by line 83 containing recirculating pump 84 to the hydrogenation stage wherein the reaction products are adjusted to the desired hydrogenation pressure and temperature by heat exchangers and compressors, not shown.

The above-described embodiment can be varied in many ways. When the catalyst is originally introduced to the hydroformylation stage as a cobalt salt which is soluble in water, the water layer which is removed in line 81 also contains an appreciable amount of cobalt salt. When the concentration of cobalt salt is sufficient, a part or all of the water layer in line 81 can be passed by means of line 86 containing valve 87 to the evaporator 88. In this evaporator, water is removed overhead by line 89 and a concentrated slurry containing cobalt, iron, and alloying metal salts is passed by line 91 to the catalyst preparation unit 92. In this unit the iron and alloying metal salts are separated and the iron salts are discharged by line 93 and water outlet line 81. The cobalt salts are removed and concentrated, and cobalt 2-ethylhexanoate is formed and recycled by means of line 94 and inlet line 4 to the hydroformylation stage.

As stated previously, the synthesis gas removed in the intermediate and low-pressure separators can be recycled. A part or all of the synthesis gas from these separators can be vented through valve 61 in line 62 and valve 78 in line 79. As pointed out previously, by operating in accordance with the above embodiment, synthesis gas removed from the intermediate and the low-pressure separators is free of cobalt and iron and other alloying elements and thus can be directly recycled. If desired, the synthesis gas which is removed from the high-pressure separator mixed with dissolved organic compounds and metal carbonyls at a pressure of about 3,500 pounds per square inch and a temperature of about 100° F. can be recycled by closing or partly closing vent valve 13 in line 12, and opening valve 14 in line 16. The synthesis gas at a pressure of about 3,500 pounds per square inch is first passed through heating unit 96 in order to reduce the concentration of carbonyls and is then passed by line 97 containing compressor 98 to synthesis gas recycle line 58 and thence to the hydroformylation stage.

The above embodiment can be employed when it is not necessary to remove both cobalt and alloying metals. For example, when it is desired only to remove cobalt, pressure regulating valve 18 is adjusted to reduce the pressure to about 5 pounds per square inch and steam is admitted at about 5 pounds per square inch into decobalting towers 23 and 23a. The mixed phase hydroformylation stage products are removed at a temperature of about 175° F., the cobalt carbonyl being decomposed and deposited on the pumice. The mixed phase products are removed from the decobalting tower and are passed to cooler 51 by line 99 containing valve 100, valve 38 in line 37 and valves 49 and 49a leading into and out of the demetalling towers, 44 and 44a, being closed. The mixed phase hydroformylation stage products are cooled in the cooler to a temperature of about 100° F. and are passed directly by valved line 101 to line 68 and then into the filter and low-pressure gas separator, valves 53 and 66 in the inlet line 52 and outlet line 64 to the intermediate pressure separator being closed. The liquid products which are free of cobalt are passed from the low-pressure gas separator by line 83 to the hydrogenation stage as before. Cobalt can be recovered from the decobalting towers as pointed out above.

When iron is used as the catalytic metal or when it is not desired to remove cobalt separately, the decobalting towers can be by-passed by means of line 102 containing valve 103, valves 21 and 38 in the inlet and outlet lines to the decobalting towers being closed.

In another embodiment of my invention, cobalt and a mixture of alloying metals are separately removed from hydroformylation stage products which are in liquid phase at an intermediate pressure and a low temperature.

Referring to Figure 1, a mixture of reactants including cobalt 2-ethylhexanoate is charged to a hydroformylation stage 6 which is at a pressure of about 3000 pounds per square inch and a temperature of about 340° F. The reaction products are removed from the hydroformylation stage and are cooled in cooler 8 to a temperature of about 100° F. to form mixed phase reaction products. The vapor phase is removed in high-pressure separator 10, and recycled to the hydroformylation stage after passing through heater 96 which is operated at about 400° F. The liquid phase is passed through pressure reducing valve 18 where the pressure is reduced to about 450 pounds per square inch. Valve 20 in line 19 is closed and the mixture of liquid and gas phase reaction products at a temperature of about 100° F. and a pressure of about 450 pounds per square inch is passed by valved line 104 to intermediate separator 105. A vapor phase consisting chiefly of synthesis gas containing a small amount of dissolved cobalt and alloying metal carbonyls is removed overhead by line 106. Synthesis gas is passed by line 107 containing valve 108 to heating unit 109 where the cobalt and alloying metals are removed. The metal-free synthesis gas is passed by line 111 through compressor 112 to the synthesis gas return line 58 and thence to the hydroformylation stage. If desired, instead of recycling the synthesis gas, all or part of it can be vented by line 114 containing pressure regulatory vent valve 113.

The liquid phase hydroformylation stage products at 450 pounds per square inch and 100° F. are passed by line 116 containing valve 117 to a point in line 19 upstream from valve 20. Saturated steam at a pressure of about 450 pounds per square inch is introduced to the decobalting towers 23 and 23a in an amount sufficient to raise the temperature of the resulting mixture to about 175° F. Cobalt carbonyl decomposes and cobalt is deposited in the decobalting towers. Iron and other alloying metals are removed in the demetalling towers 44 and 44a in a similar manner by the introduction of sufficient saturated steam at about 450 pounds per square inch to raise the temperature of the resulting mixture to about 400° F. The liquid phase hydroformylation stage products are cooled in cooler 51 and passed by line 52 and line 121 containing valve 122 to pressure reducing valve 67 and inlet line 68 to filter 69, valves 53 and 66 in lines 52 and 64 leading into and out of intermediate pressure separator 56 being closed. After a water layer is removed in low-pressure trap 73, the hydroformylation stage products are passed to the hydrogenation stage.

This embodiment can also be varied in a number of ways. For example, it can be employed for removing only cobalt or only a mixture of alloying metals in the manner pointed out above.

When operating in accordance with the process of my invention, steam is admitted directly into the reaction products and the temperature of the resulting mixture is uniformly increased. As stated previously, cobalt or alloying metals can therefore be removed in an efficient manner and are not deposited on the walls of the vessel containing the hydroformylation stage products. Although preferred results are obtained when substantially pure steam is employed for heating the metal carbonyl or carbonyls, the steam can contain a small amount of volatile acids, preferably organic acids such as formic, acetic, and propionic acids.

Obviously many modifications and variations of the invention as hereinbefore set forth can be made without departing from the spirit and scope thereof, and therefore only such limitations should be imposed as are indicated in the appended claims.

I claim:

1. A process for removing cobalt carbonyl and at least one metal carbonyl selected from the group consisting of iron, nickel, chromium and molybdenum carbonyls from hydroformylation stage products containing such metal carbonyls which comprises introducing steam to said hydroformylation stage products in an amount sufficient to heat said hydroformylation stage products to the decomposition temperature of cobalt carbonyl but below the decomposition temperatures of the remaining metal carbonyls in said hydroformylation stage products, separating the resulting cobalt from said hydroformylation stage products, introducing steam to said treated hydroformylation stage products in an amount sufficient to heat the same to the decomposition temperature of at least one of said metal carbonyls selected from the group consisting of iron, nickel, chromium and molybdenum carbonyls, and separating the resulting metal from said latter treated hydroformylation stage products.

2. A process for removing cobalt carbonyl and at least one metal carbonyl selected from the group consisting of iron, nickel, chromium and molybdenum carbonyls from hydroformylation stage products containing such metal carbonyls which comprises introducing said hydroformylation stage products and steam into a first demetalling zone, the amount of steam being sufficient to raise the temperature of the resulting mixture to about 165° to 212° F. and decompose cobalt carbonyl in said first demetalling zone, removing the resulting cobalt from said mixture, introducing the remaining mixture and additional steam into a second demetalling zone, the amount of said additional steam being sufficient to raise the temperature of the resulting mixture to about 340° to 420° F. and decompose at least one of said metal carbonyls selected from the group consisting of iron, nickel, chromium and molybdenum carbonyls, and separating the resulting metal from said latter resulting mixture.

3. A process for removing cobalt carbonyl and at least one metal carbonyl selected from the group consisting of iron, nickel, chromium and molybdenum carbonyls from hydroformylation stage products containing such metal carbonyls which comprises introducing said hydroformylation stage products and saturated steam at a pressure of about 450 pounds per square inch and a temperature of about 460° F. into a first demetalling zone, the amount of steam being sufficient to raise the temperature of the resulting mixture to about 175° to about 212° F. and decompose cobalt carbonyl in said first demetalling zone, removing the resulting cobalt from said mixture, removing the remaining mixture from said first demetalling zone with said steam having a partial pressure of about one atmosphere, introducing said remaining mixture at a pressure of about 440 pounds per square inch and a temperature of about 212° F. and additional steam at a pressure of about 440 pounds per square inch into a second demetalling zone, the amount of said additional steam being sufficient to raise the temperature of the resulting mixture to about 380° to about 400° F. and decompose at least one of said metal carbonyls selected from the group consisting of iron, nickel, chromium and molybdenum carbonyls, and separating the resulting metals from said latter resulting mixture.

References Cited in the file of this patent

UNITED STATES PATENTS

| | | |
|---|---|---|
| 2,504,682 | Harlan | Apr. 18, 1950 |
| 2,508,743 | Bruner | May 23, 1950 |
| 2,514,961 | Max | July 11, 1950 |
| 2,560,360 | Mertzweiller et al. | July 10, 1951 |
| 2,564,456 | Vlugter et al. | Aug. 14, 1951 |
| 2,595,096 | Parker | Apr. 29, 1952 |
| 2,638,485 | Mertzweiller | May 12, 1953 |

OTHER REFERENCES

Latimer and Hildebrand: "Reference Book of Inorganic Chemistry," page 397, revised ed. Copyrighted 1940 by the MacMillan Co., New York.

Handbook of Chemistry and Physics, 32nd ed. (1950), pp. 504–5 and 526–7.

Chemical Rubber Publishing Co., Cleveland, Ohio.